United States Patent [19]

Cushman et al.

[11] 3,890,158

[45] June 17, 1975

[54] WAX EMULSIONS FOR CONTROLLING TRANSPIRATION IN PLANTS

[75] Inventors: Donald R. Cushman, Wenonah; Edward A. Oberright, Woodbury, both of N.J.; Roy T. Edwards, deceased, late of Mullica Hill, N.J.; by Katherine Edwards, legal representative, Mullica Hill, N.J.

[73] Assignee: Mobil Oil Corporation, New York, N.Y.

[22] Filed: Oct. 18, 1973

[21] Appl. No.: 407,706

Related U.S. Application Data

[60] Continuation-in-part of Ser. No. 256,997, May 25, 1972, Pat. No. 3,791,839, which is a continuation-in-part of Ser. No. 60,957, July 2, 1970, abandoned, which is a division of Ser. No. 639,041, May 17, 1967, abandoned.

[52] U.S. Cl. .................................. 106/271; 117/3

[51] Int. Cl. ............................................ C08h 9/06
[58] Field of Search ................ 106/271; 208/21, 22

[56] References Cited

UNITED STATES PATENTS

| | | | |
|---|---|---|---|
| 2,015,739 | 10/1935 | Winning | 208/21 |
| 2,261,229 | 11/1941 | Cothran | 106/271 |
| 2,383,451 | 8/1945 | Cothran | 106/271 |
| 3,354,180 | 11/1967 | Ekiss | 106/271 |

*Primary Examiner*—Theodore Morris
*Attorney, Agent, or Firm*—Charles A. Huggett; Raymond W. Barclay; Benjamin I. Kaufman

[57] ABSTRACT

Transpiration in plants, particularly during growth in dry climates, transplantation or shipment, is controlled by application to the plant surface of wax emulsion compositions comprising paraffin wax, petrolatum, emulsifier and water.

5 Claims, No Drawings

WAX EMULSIONS FOR CONTROLLING TRANSPIRATION IN PLANTS

CROSS-REFERENCE TO RELATED APPLICATIONS

Continuation-in-part of application Ser. No. 256,997, filed May 25, 1972, now U.S. Pat. No. 3,791,839, which, in turn, is a continuation-in-part of application Ser. No. 60,957, filed July 2, 1970, abandoned, which in turn is a division of application Ser. No. 639,041, filed May 17, 1967, abandoned.

BACKGROUND OF THE INVENTION

1. Field of the Invention

This invention relates to wax emulsion compositions and, in one of its aspects, relates more particularly to wax emulsions for controlling transpiration in plants, especially during growth in dry climates, transplantation or shipment. Still more particularly, in this aspect, the invention relates to a method for controlling transpiration in plants, particularly during growth, transplantation or shipment, by applying to the plant surface a wax emulsion composition having the specific formulation hereinafter described.

2. Description of the Prior Art

Moisture loss in plant life in the form of transpiration is normally encountered during growth in dry climates, transplantation or shipment, and can result in wilting or other forms of damage, or ultimate destruction. Such occurrence is particularly applicable to the growth, transplantation or shipment of various types of plant life, such as tobacco, fruit, vegetables, trees and other forms of vegetation. To offset the effects of such moisture loss due to transpiration, wax has heretofore been applied to the exterior surfaces of plants, fruit and other vegetation. In this respect, it has been found that in some instances breathing of the plant was greatly impaired to such extent that substantial damage resulted. In other instances, insufficient improvement in avoiding moisture loss was observed because of failure of the wax to provide adequate surface coverage. Such deleterious results have been particularly encountered during transplantation operations. In attempting to apply a wax in the form of an emulsion to the plant surface to offset the effects of moisture loss due to transpiration, insufficient improvement in avoiding moisture loss has also been realized, inasmuch as wax ultimately deposited on the plant surface tends to undergo cracking as plant growth continues, with concomitantly rapid moisture loss.

SUMMARY OF THE INVENTION

It has now been found that transpiration in plants such as tobacco, vegetables, fruits, particularly drupaceous fruits such as cherries, olives, apricots or peaches, trees and other forms of vegetation, can be effectively controlled during growth, transplantation or shipment by applying to the plant surface a composition in the form of a wax emulsion comprising a paraffin wax, petrolatum, an emulsifier and water. With respect to the individual components employed in producing the wax emulsion compositions of the present invention, the wax component is employed in an amount from about 15 to about 40, and preferably from about 20 to about 30%, by weight, of the total quantity of the emulsion. The petrolatum is employed in an amount from about 5 to about 30, and preferably from about 10 to about 20%, by weight, of the total quantity of the emulsion. The emulsifier is employed in an amount from about 2 to about 10, and preferably from about 4 to about 8%, by weight, of the total quantity of the emulsion. Water is employed in an amount sufficient to balance the formulation.

The wax component of the emulsion may comprise any paraffin wax obtained from petroleum oil and may include microcrystalline wax such as obtained from petroleum residua; also, paraffin waxes modified with various polymers, e.g., polyethylene, or copolymers such as ethylene-vinyl acetate copolymers and similar polymeric materials. In general, paraffin wax having a melting point of from about 115°F. to about 150°F. is preferred, and such wax may comprise high molecular weight hydrocarbons, comprising, generally, straight-chain compounds having a crystalline structure in solid form. Microcrystalline wax may be employed, as hereinbefore indicated, and is obtained from petroleum oil. This material may possess a melting point of about 150°F. to about 190°F. and contains a substantial portion of high molecular weight hydrocarbons having branched-chain and ring structures. This material is more plastic in nature than paraffin wax. Petrolatum is commercially obtained from petroleum and comprises a mixture of microcrystalline wax and petroleum oil.

The emulsifier employed in the wax emulsions of the present invention is of the non-ionic type and may also include emulsifiers of the anionic type in combination therewith. Many non-ionic emulsifiers can be used in this emulsion provided the critical relationship between oil solubility and water solubility is maintained. Typical of such emulsifiers are mixtures of sorbitan monooleate and polyoxyethylene sorbitan monooleate. Typical other non-ionic emulsifiers suitable for use in these wax emulsions are polyoxyethylene ethers of octyl or nonyl phenol having variable amounts of ethylene oxide content per mol of finished product required to provide the oil and water solubility characteristics. Thus, for example, a portion of polyoxyethylene ethers of octyl phenol having about 5 mols of ethylene oxide per mol of finished product when blended with a like amount of polyoxyethylene ethers of octyl phenol having about 10 mols of ethylene oxide per mol of finished product, provides an emulsifier combination having the desired water and oil solubility. As the ethylene oxide content is reduced, oil solubility is enhanced, whereas as the ethylene oxide content is increased, water solubility is enhanced. A blended product having sufficient oil-soluble and water-soluble constituents and possessing an average ethylene oxide content per mol of finished product between about 5 and 10 is quite satisfactory. Other non-ionic emulsifiers contemplated within the scope of the present emulsions are exemplified by partial esters of fatty acids (e.g., palmitic, stearic, oleic and the like) and hexitol anhydrides (hexitans and hexides) derived from sorbitol. These materials, to which polyoxyethylene chains have been added to the non-esterified hydroxyls to increase water solubility, are blended with the untreated material to provide solubility balance. Also usable in this area are the condensation products of ethylene oxide and relatively high molecular weight polypropylene glycol. The molecular weight of the polypropylene glycol portion may be 1,000–2,000. The molecular weight of the compound may be as high as 8,000.

As hereinbefore indicated, the non-ionic emulsifier employed in the wax emulsion may also be employed in combination with emulsifiers of the anionic type. These may include triethanolamine, alkali metal and morpholine soaps, or other soaps, lignin sulfonates and naphthalene sulfonates. Protective colloids may also be advantageously employed such as natural gums, gelatin, casein, cellulose derivatives and the like. Particularly preferred, are emulsifiers comprising non-ionic and anionic type emulsifiers. Such combination of emulsifiers is particularly desirable since it results in improved storage stability of the emulsion by avoiding separation of the hydrocarbon phase during storage.

Of particular importance is the presence of the petrolatum component in the wax emulsion. In this respect, as more fully hereinafter described, applying the wax in the form of an emulsion to the plant surface (without the added presence of petrolatum), little or no improvement in avoiding moisture loss due to transpiration, is obtained, inasmuch as the wax ultimately deposited on the plant surface, undergoes cracking during plant growth, with concomitantly rapid moisture loss. The presence of petrolatum in the emulsion, on the other hand, imparts flexibility to the wax component, entirely eliminating or significantly reducing cracking of the wax component, and, thereby, rapid moisture loss is significantly avoided. Application of the novel emulsions of the present invention, particularly to drupaceous fruits shortly before harvest (usually about one week) can significantly increase the size of the fruit and result in improved yield per acre.

DESCRIPTION OF SPECIFIC EMBODIMENTS

The following data and examples will serve to illustrate the effect of the wax emulsions employed in accordance with the method of the present invention for the purpose of controlling transpiration in plants during growth, transplantation and shipment and the outstanding advantages realized when employed in such capacity and, also, the importance of having petrolatum present in combination with the wax component. In this connection, it will be noted that the water status of plants depends upon the relative rate of water uptake by roots and water loss by transpiration. Under normal conditions, the amount of water lost by transpiration corresponds to the amount of water which is available to the plant roots. Thus, the amount of water transpired can be measured as a function of the amount of water taken up through the roots. In accordance with such standard, a series of experiments was carried out to determine the rate of transpiration in plants and intact tobacco plants, in particular, with a potometer. These experiments were carried out in the following manner.

The potometer employed in accordance with these experiments, and as shown in the examples hereinafter set forth, comprised apparatus which consisted of a 250 ml. capacity filtering flask with side-tube and calibrated capillary tube which extended into a water reservoir. At the time of carrying out the experiment, the flask and capillary tube were filled with water, except for a small air bubble trapped in the capillary tube. The rate of transpiration was then measured as a function of the rate of migration of the air bubble in the capillary tube. The procedure for carrying out the determination of the rate of transpiration comprised mounting young tobacco plants having about three fully expanded leaves into the filtering flask through a hole in the rubber stopper. The flask and capillary tube were filled with water and the system was allowed to equilibrate for a period of about one hour. In order to facilitate transpiration, a heat lamp was placed next to the potometer. After the plants had reached a stable rate of transpiration, chemical applications were made by spraying the leaves on both sides with appropriate dilutions of the wax emulsion test material. The rate of transpiration was measured as a function of the time in which it took for the air bubble to move one-tenth the length of the capillary tube. An average of five readings was taken for one determination. Data were taken at 15-minute intervals for a period of 90 to 120 minutes.

Each of the experiments was conducted in the morning when the plants were turgid. During these experiments, the temperature was kept constant at 26.6°C. to 27.0°C. The results of five series of experiments are shown in the following Table I in which two different types of wax emulsions were employed. The composition of each of these emulsions was as follows: Emulsion No. 1 comprised, by weight, 40% paraffin wax having a melting point of 125°–127°F.; 6% of an emulsifier comprised of 4.5% of a mixture of $C_{16}$-$C_{20}$ fatty acids and 1.5% triethanolamine; 0.5% of iso-octyl phenoxy polyethoxyethanol as a wetting agent; and 53.5% water. Emulsion No. 2 comprised, by weight, 30% paraffin wax having a melting point of 125°–127°F.; 17% petrolatum; and emulsifier comprised of 3.5% sorbitan monooleate and 3.3% polyoxyethylene sorbitan monooleate; 0.1% formalin; and 46.1% water.

TABLE I

THE EFFECT OF WAX EMULSIONS ON TRANSPIRATION AS MEASURED BY WATER UPTAKE IN A POTOMETER*
Average of 5 Determinations

| Water : emulsion ratio | 5:1 |
|---|---|
| | Example 1 |
| Control | 20.72 |
| Emulsion No. 1 | 28.44 |
| | Example 2 |
| Control | 20.64 |
| Emulsion No. 2 | 30.62 |

*Seconds required to absorb one unit of water

The data disclosed in Table I shows that for each emulsion transpiration was reduced after the wax emulsion was applied to the leaf surface. However, the petrolatum-containing emulsion (emulsion No. 2) represented an improvement of almost 30% over that of emulsion No. 1 which did not contain petrolatum.

A preferred petrolatum-containing emulsion, is one, comprising, approximately, by weight, 25.5% of 125/127 AMP refined paraffin wax; 14.5% petrolatum; 2.5% sorbitan monooleate; 2.3% polyoxyethylene sorbitan monooleate; 1.0% hydrogenated marine oil fatty acids; 0.35% triethanolamine; 0.1% formalin; and water in an amount sufficient to form the emulsion.

Another preferred petrolatum-containing emulsion, is one comprising, approximately, by weight, 25.5% of 133/135 AMP refined paraffin wax; 14.5% petrolatum; 2.5% sorbitan monooleate; 2.3% polyoxyethylene sorbitan monooleate; 1.7% hydrogenated marine oil fatty acids; 0.2% potassium hydroxide; and 53.3% water.

Still another preferred petrolatum-containing emulsion, is one comprising, approximately, by weight, 25.5% of 133/135 AMP refined paraffin wax; 14.5% petrolatum; 2.5% sorbitan monooleate; 2.3% polyoxyethylene sorbitan monooleate; 1.3% hydrogenated marine oil fatty acids; 0.3% morpholine; and 53.6% water.

As hereinbefore indicated, the presence of petrolatum in the emulsion imparts flexibility to the wax component. This, in turn, is related to the opening and closing of the stomata (pores) of the leaves or other plant surface, the softer wax providing the desired increased flexibility. In contrast, the more brittle paraffin tends to crack, losing a marked degree of effectiveness as an anti-transpirant.

In order to further demonstrate the importance of having petrolatum present in the emulsion, in combination with the paraffin wax component, a series of tests was carried out in which tobacco plants were dipped in the wax emulsions containing either paraffin wax alone, or paraffin wax in combination with petrolatum. Each plant, thus treated, was planted in dry sand and the required time was noted for each plant to die (desiccation), as shown in the following table. Emulsion A comprised, by weight, 25.5% paraffin wax having a melting point of approximately 125°–127°F.; 3.5% sorbitan monooleate; 3.3% polyoxyethylene sorbitan monooleate; 0.1% formalin; and 46% water. Emulsion B comprised, by weight, 30% paraffin wax having a melting point of approximately 125°–127°F.; 17% petrolatum; 2.6% sorbitan monooleate; 2.4% polyoxyethylene sorbitan monooleate; 0.1% formalin; and 47.9% water.

In these tests 24 plants were tested employing each of the above-described emulsions A and B, and the average time for desiccation was noted, as shown in the following table.

TABLE II

| | Average Time for Desiccation (days) |
|---|---|
| Emulsion A | 11.4 |
| Emulsion B | 15.9 |

A further advantage in the use of the above-described petrolatum-containing emulsions of the present invention, is the ability to employ these emulsions on vegetation such as non-deciduous ornamental shrubs, trees and the like to protect them against "winter kill." A chief cause of winter kill is an excessive loss of moisture from leaf surfaces on sunny or windy days when the ground is frozen and the root systems cannot replace the water lost. An effective antitranspirant, such as that of the present invention, reduces such moisture loss. In practice, in this respect, plants are sprayed in the late fall and late winter on above-freezing days, employing the petrolatum-containing wax emulsion, preferably diluted with 4 parts of water.

For purposes of experimentation, approximately 1400 plants were tested (holly and azaleas) employing the aforementioned petrolatum-containing wax emulsion B of the present invention. Following the fall and winter seasons no damage was observed on the treated holly, and only slight damage to the treated azaleas, whereas more significantly undesirable damage was observed on the untreated plants.

In another series of experimentations, the novel emulsion B of the present invention was employed for dipping cut flowers to reduce wilting. The emulsion was employed in dilutions of 5:1. The results obtained were entirely satisfactory, particularly on such flowers as wreaths, enabling them to be made up ahead of time. It was found that flowers treated with the wax emulsions of the present invention remained fresh approximately twice as long as the untreated flowers.

In still another series of experimentations, observations were made on the appearance of plants, one week and also one month, after planting. In these ratings the sum of the individual ratings per plot were recorded. Each plot was scored on a rating of from 1 to 5. In this respect, a rating of 1 is considered poor while a rating of 5 is considered good. As shown in the following Table III, it will be seen that the petrolatum-containing wax emulsions of the present invention have a significantly higher rating than the check plants which were untreated.

TABLE III

Field Tests

Numerical plant ratings
(General appearance, vigor, and wilting)
96 Plants per plot

| Treatment | Rating 1 Week After Planting | | | | | Total |
|---|---|---|---|---|---|---|
| | 1 | 2 | 3 | 4 | 5 | |
| Check | 191 | 144 | 143 | 160 | 142 | 780 |
| Emulsion B | 199 | 214 | 217 | 199 | 204 | 1033 |
| | Rating 1 Month After Planting | | | | | |
| Check | 242 | 266 | 229 | 259 | 268 | 1264 |
| Emulsion B | 257 | 251 | 241 | 272 | 280 | 1301 |

From the foregoing, it will become apparent that the present invention provides an effective method for controlling transpiration in plants, and is therefore particularly effective during growth, transplantation or shipment. It will also be apparent that the wax emulsions applied to the plant surfaces for effectively controlling transpiration can, of course, be varied to adapt them to specific commercial requirements. Although the present invention has been described herein by means of certain specific embodiments and illustrative examples, it is not intended that the scope thereof be limited in any way, and is capable of various modifications and adaptations, as those skilled in the art will readily appreciate.

We claim:

1. A wax emulsion composition consisting essentially of, by weight, from about 15 to about 40% paraffin wax having a melting point of from about 115°F. to about 190°F.; from about 5 to about 30% petrolatum; from about 2 to about 10% of an emulsifier comprising a mixture of sorbitan monooleate and polyoxyethylene sorbitan monooleate or their stearates and at least one member of the group consisting of alkali metal and morpholine soaps; and water in an amount sufficient to form the emulsion.

2. The emulsion of claim 1 wherein said emulsion comprises, by weight, from about 20 to about 30% paraffin wax; from about 10 to about 20% petrolatum and from about 4 to about 8% emulsifier.

3. The emulsion of claim 1 wherein said emulsion contains a minor amount of formalin.

4. A wax emulsion composition comprising, approximately, by weight, 25.5% of 133/135 AMP refined paraffin wax; 14.5% petrolatum; 2.5% sorbitan monooleate; 2.3% polyoxyethylene sorbitan monooleate; 1.7% hydrogenated marine oil fatty acids; 0.2% potassium hydroxide; and water in an amount sufficient to form the emulsion.

5. A wax emulsion composition comprising, approximately, by weight, 25.5% of 133/135 AMP refined paraffin wax; 14.5% petrolatum; 2.5% sorbitan monooleate; 2.3% polyoxyethylene sorbitan monooleate; 1.3% hydrogenated marine oil fatty acids; 0.3% morpholine; and water in an amount sufficient to form the emulsion.

* * * * *